Aug. 25, 1942.  W. NANFELDT  2,293,914
PROCESS OF MAKING FRICTION LINING
Filed June 4, 1940   2 Sheets-Sheet 1
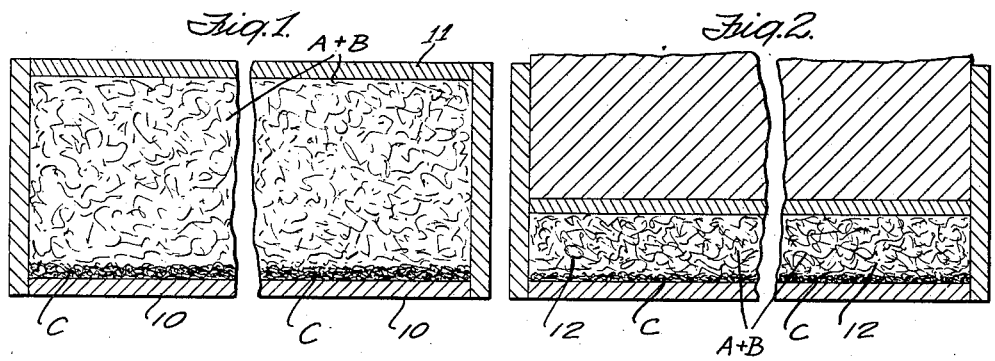
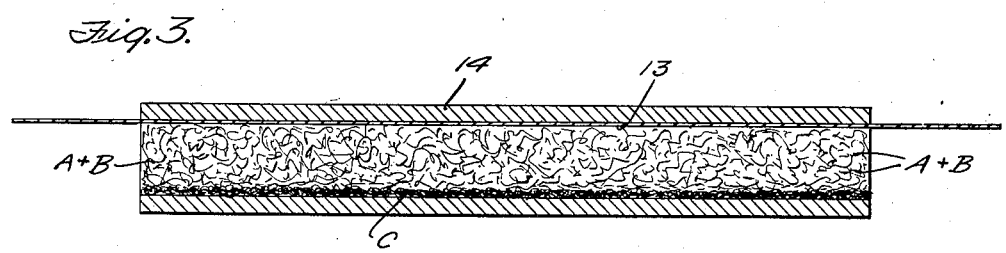
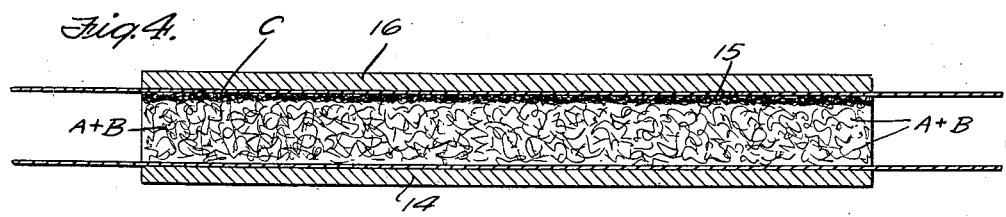
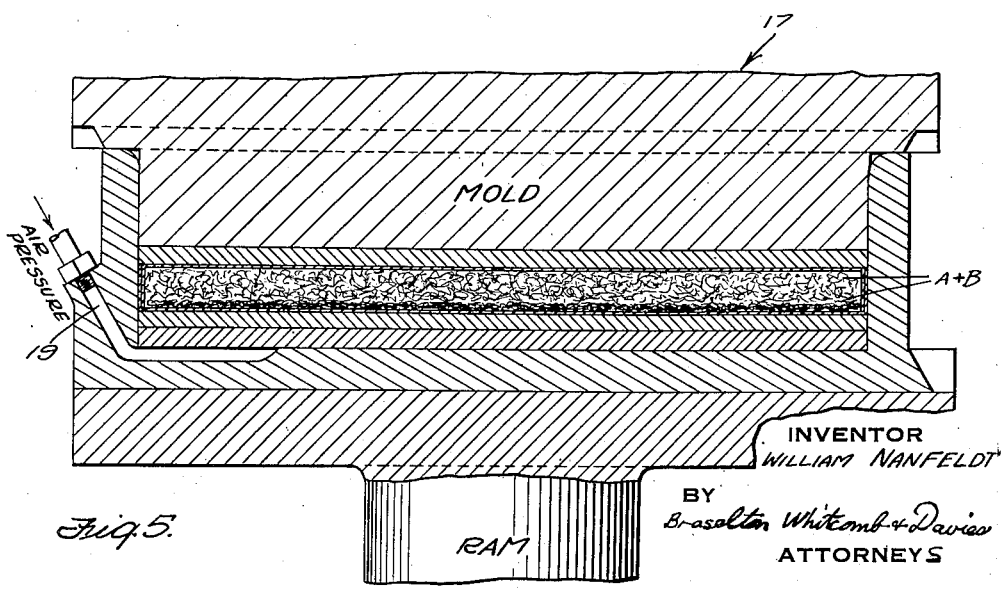
INVENTOR
WILLIAM NANFELDT
BY Braselton, Whitcomb & Davies
ATTORNEYS Aug. 25, 1942.                    W. NANFELDT                    2,293,914
                        PROCESS OF MAKING FRICTION LINING
                        Filed June 4, 1940           2 Sheets-Sheet 2
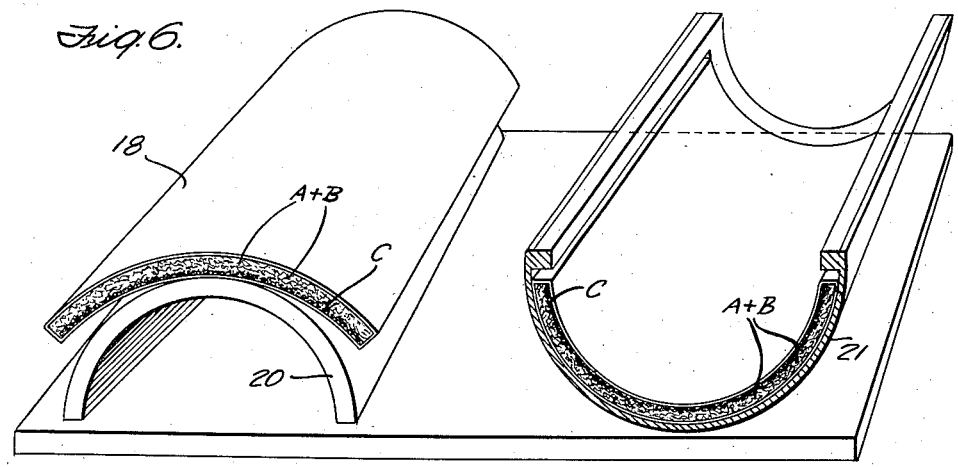
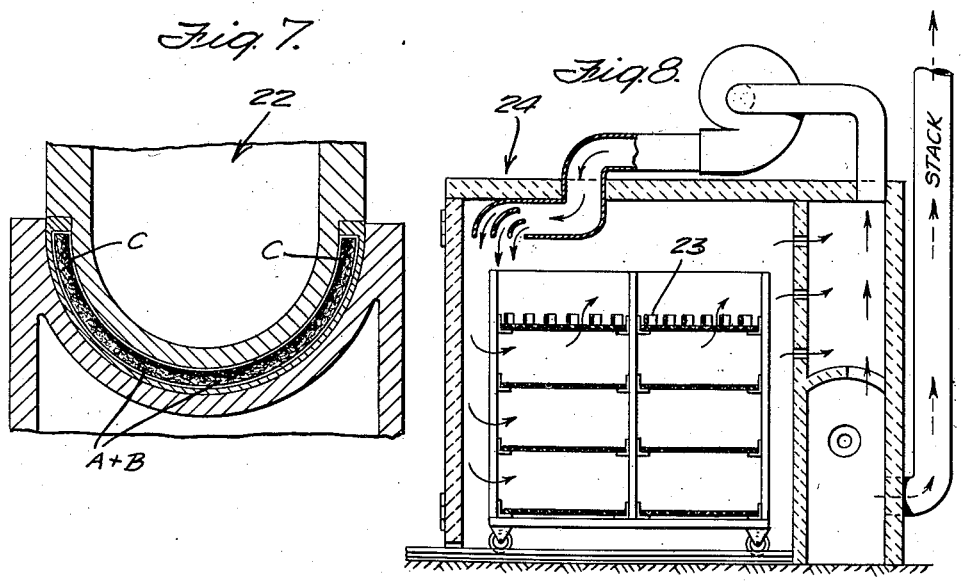
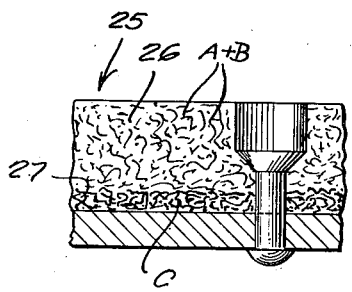
INVENTOR
WILLIAM NANFELDT
BY
Braselton Whitcomb + Davies
ATTORNEYS Patented Aug. 25, 1942

2,293,914

UNITED STATES PATENT OFFICE 2,293,914

PROCESS OF MAKING FRICTION LINING

William Nanfeldt, Clifton, N. J., assignor to World Bestos Corp., Paterson, N. J., a corporation of New Jersey Application June 4, 1940, Serial No. 338,696

8 Claims. (Cl. 18—47.5)

This invention relates to the manufacture of friction material. More particularly, the invention pertains to a molded friction material and a process for making the same having utility in connection with clutch facings, brake blocks, brake linings and miscellaneous other friction elements for mechanism.

Among the objects of the present invention is to provide an improved process for making brake lining which will enable the manufacture of lining to be completed within a short time interval after the mixing of the component ingredients. Another object is to provide a process which will reduce to a minimum the formation of surface fissures or cracks on the lining slabs during the intermediate steps of the process. Still another object is to provide a process for making brake lining which is susceptible to efficient control of the various reactions occurring during the treatment of the composite material, such as the degree of hardness, the resiliency of the product, the extent of hardening of the resinous ingredients, the degree of combination of the sulphur and linseed oil, and other reactions.

An object of the invention also is to provide a product which has a hardness not exceeding 3 Mohs. A further object is to provide a friction product which has uniformity of frictional coefficient for normal ranges of temperature as well as temperatures approximating 900° F. An object also is to provide a friction material having properties through which noise of operation is practically eliminated. Further objects of the invention relate to the high normal and shear resistance of the finished lining, to the employment of certain materials which will not materially modify under the influence of heat within the usual range of use, to the provision of materials in a brake lining having flat particle formation susceptible to breakage with sharp, jagged or conchoidal fracture, and other features such as will appear from consideration of the following description of my invention and of the accompanying drawings, in which:

Fig. 1 is a view indicating the raw material in condition to be compressed;

Fig. 2 is a view showing the raw material after the first compression;

Fig. 3 is a view illustrating the application of a sheet of Cellophane and a metal sheet to one side of the friction slab;

Fig. 4 is a view showing the application of sheets of Cellophane and metal to both sides of the slab;

Fig. 5 illustrates the mode of compression in a mold;

Fig. 6 is a view illustrating the method of curving the slab and positioning the same in a curved pan;

Fig. 7 illustrates the pan and contained slab in position in a compressor;

Fig. 8 is a view of the formed friction bands receiving treatment in an oven; and Fig. 9 is a detail showing the mode of attachment of brake lining on a brake shoe.

In my co-pending application Serial No. 29,763, filed July 3rd, 1935, and issued as Patent No. 2,155,020, I describe a molded friction lining of high utility, in the process of manufacture of which use is made of at least three compositions denoted as compositions A, B and C, composition B forming the framework of the brake lining and including materials giving a more or less rigid structure to the same; composition A being formed of materials which develop an efficient frictional coefficient and which are dispersed through the cellular construction of the B composition in spaced masses; and composition C being formed of materials suitable for forming a backing for the primary friction compositions A and B.

In the present application, which is a continuation in part of my co-pending application Serial No. 257,664, filed February 21, 1939, I will describe a composition and the process for making the same, giving a friction lining in which the frictional coefficient diminishes by less than 35% in the vicinity of 900° F. In the composition of this application, similarly I employ three compositions A, B and C, the function of each of these compositions being similar in function to that of the allied compositions in the co-pending application referred to, the composition A forming the primary friction material; composition B constituting the holding and framework material; and composition C forming the backing for the friction lining or material.

The composition which I denote as composition A, together with a permissible range of percentages and an example of preferred percentages, is as follows:

| Materials | Ranges | Example |
|---|---|---|
|  | Per cent | Per cent |
| 2% blown sulphurized linseed oil | 5 to 18 | 14.28 |
| Liquid cresol resin | 2 to 18 | 8.79 |
| Sulphur | 1 to 3 | 2.20 |
| XX asbestos fiber | 45 to 65 | 60.45 |
| Albany slip clay | 5 to 15 | 9.88 |
| Iron oxide | 1 to 4 | 2.20 |
| 150 mesh powdered mica | 1 to 4 | 2.20 |

The 2% blown sulphurized linseed oil is a sulphur-linseed oil mixture made by mixing boiled, bodied or blown linseed oil with about 2% of its weight of sulphur to a temperature of about 350° F. for a time period sufficient to cause the oil to take up and absorb the sulphur. By so treating the linseed oil, oxidation, together with the undesirable hardness resulting therefrom, is prevented.

The resin element of the composition is in the form of liquid cresol resin. I have found this form of resin to be desirable in the friction A composition since it reduces to some extent the resiliency of the composition and assists in the controlling of the reaction between the sulphur and the sulphurized linseed oil in the subsequent baking operation. This latter characteristic of the resin comes from the fact that the resin does not combine with sulphurized linseed oil, but on the contrary, tends to form an emulsion therewith, thus slowing down the reaction between the oil and sulphur. When heated over a sufficient length of time the cresol resin passes over into the infusible state where it has a Mohs scale hardness of slightly less than 3.

The sulphur employed is the pure flowers of sulphur finely ground so as to readily combine with the linseed oil in the baking operation. The purpose of the sulphur is to form a compound with the linseed oil to prevent polymerization of the oil into a relatively hard material and to provide a resilient element in the friction substance, the compound having properties somewhat similar to that of rubber. I prefer to use Albany slip clay, but any other clay having particles with similar physical charaercteristics such as a plate-like and perforated formation and a hardness according to the Mohs scale of approximately 2 may be employed. The function of the slip clay is to provide a filler which assists in controlling the resiliency and density of the A composition. The clay also has a lubricating nature and when mixed with sulphurized linseed oil it assists materially in the mixing operation of the A composition in the dough mixer.

I employ powdered mica which will pass through a 150 to the inch mesh, and the type known as amber mica or its equivalent is preferred. The purpose of the mica is to provide a composition material which is of plate-like particles and therefore resistant to pressure. The mica is formed in laminated sheets and is more or less brittle and when subjected to shearing pressure tends to delaminate, causing the frictional surface of the lining to shift and thereby assisting in the stabilization of the surface friction and tending to prevent glazing or polishing of the same.

Iron oxide is used in the A composition in the form of a fine powder having a low frictional value and a Mohs scale hardness of around 2½. The characteristic action of the iron oxide particles is to assist in the control of the frictional value of the finished lining through the tendency of the particles to take on a polish under pressure.

The asbestos fibre is known in the trade as "double X" (XX) and consists of mine run asbestos having short fibres which has been treated in a rotary disintegrator to shred and separate the bundles of fibres. After such treatment it is found that the hardness is reduced to slightly less than 3 Mohs over the normal asbestos hardness ranging from 3 to 3½ Mohs. In this treatment also rock dust and other foreign matter is removed.

The composition which I denote as composition B, together with a permissible range of percentages and an example of preferred percentages, is as follows:

| Materials | Ranges | Example |
|---|---|---|
|  | Per cent | Per cent |
| Powdered cresol resin | 15 to 30 | 27.21 |
| Hexamethylenetetramine | 1 to 3 | 1.36 |
| Carbon black | 0.5 to 3 | 1.36 |
| Graphite | 0.5 to 3 | .68 |
| Blood albumen | 1 to 6 | 5.44 |
| Shingle asbestos fiber | 38 to 50 | 44.90 |
| Fused and pulverized litharge | 1 to 10 | 5.44 |
| Scrap of final mixture | 1 to 15 | 13.61 |

As will be seen from this list, cresol resin is employed also in the B groups of materials but in powdered instead of liquid form. Asbestos is also employed but of a type known as shingle asbestos. This asbestos differs over the double X asbestos fibre in that it is obtained by treating long fibred asbestos in a disintegrator, a shaker and blower, and then subsequently re-run through the disintegrator to further break up the fibres so that the average fibre length of the re-ground fibre is approximately the same as the double X mine-run fibre, that is, approximately ⅜" or less. In addition to these two substances I employ, as appears from the above list, materials other than that used in the A composition.

Hexamethylenetetramine is used in small amounts to act as a catalyzer or hardener, this substance tending to hasten the polymerization of the cresol resin with heat. Carbon black has been found useful as a part of the brake lining structure as a controlling factor in the surface friction of the material. The carbon black is in the form of very small particles which spread about over the surface and tend to prevent or counteract glazing or other modification of the surface structure which will induce lack of stability in the frictional coefficient. The purpose of the graphite is to add a dry lubricating element to the friction lining.

The advantages of using metallic lead in a frictional surface such as a brake lining have been known for some time. However, the melting point of lead is around 621° F. and hence at the high temperatures now employed in heavy duty lining, amounting to points in excess of 800° F., the lead is melted and its function as a friction element under these high temperatures destroyed. I have found that by using litharge, which has a much higher melting point, I can make the lead arising from a decomposition of the litharge effective at these high brake lining temperatures. To accomplish this breakdown of the litharge I employ blood albumen, which has the property of combining with the oxygen of the litharge when mixed with ground and pulverized litharge and heated to a temperature approaching 800° F., at which temperature the albumen tends to decompose and combine with the oxygen and liberate free metallic lead. The lead liberated at these high temperatures has a stabilizing value on the friction since, with other properties, it shifts on the friction face, preventing a hard, smooth and carbonized surface from forming.

The albumen, in addition to combining with the litharge, tends to prevent the lining from being noisy when used in contact with brake drums. This is probably due to the fact that it does not melt to a fluid with heat but becomes slightly plastic and as the temperature rises eventually it passes over to a soft carbon residue which does not harm the frictional properties of the lining since its Mohs' scale hardness is around 2. A type of blood albumen which I found to be highly satisfactory for this use has been analyzed to indicate the following composition:

| Components | Whole blood |
|---|---|
| | Per cent |
| Water | 80.890 |
| Total solid matter | 19.110 |
| Haemoglobin | 10.310 |
| Protein | 6.979 |
| Sugar | 0.071 |
| Cholesterin | 0.194 |
| Lecithin | 0.235 |
| Fat | 0.063 |
| Phosp. acid as nuclein | 0.0027 |
| Sodium oxide | 0.364 |
| Potassium oxide | 0.041 |
| Iron oxide | 0.054 |
| Calcium oxide | 0.008 |
| Magnesium oxide | 0.0036 |
| Chlorine | 0.308 |
| Phosphoric acid | 0.040 |
| Inorganic $P_2O_5$ | 0.017 |

The litharge used is made by heating ordinary litharge until it melts to a fluid, and after it has cooled and solidified, grinding and pulverizing the same so that it will pass through a 100 to the inch mesh screen. These litharge particles are similar to flat plates in structure with jagged edges which make them effective as a frictional component in the use of the lining at lower temperatures. These litharge particles differ over those of ordinary litharge, which are ball-like in shape and consequently have poor frictional qualities and attempt to weaken the lining structure.

The materials forming the C composition for backing the lining include the following, with range of percentages as well as a specific percentage example:

| Materials | Ranges | Example |
|---|---|---|
| | Per cent | Per cent |
| Powdered cresol resin | 18 to 28 | 24.00 |
| Carbon black | 0.25 to 3 | 1.00 |
| Shingle asbestos fiber | 50 to 70 | 69.00 |
| Scrap of final mixture | 1 to 10 | 6.00 |

It is noted that the various compositions are described each as a unit, the component materials forming 100%. In relation to the final composition, as for example, in the brake lining, the percentage of the group materials in a typical example may be varied within limits, such as 10% to 40% of the A group, 20% to 50% of the B group, and 5% to 30% of the C group. A typical percentage relationship is: group A—29.2%, group B—50.8%, and group C—20.0%.

Further, as regards the individual materials entering into the completed composition or brake lining, the percentage ranges and a typical example follow:

| Materials | Ranges | Example |
|---|---|---|
| | Per cent | Per cent |
| 2% blown sulphurized linseed oil | 2 to 8 | 4.17 |
| Liquid cresol resin | 2 to 8 | 2.57 |
| Sulphur | 0.25 to 1 | .64 |
| XX asbestos fiber | 10 to 25 | 17.66 |
| Albany slip clay | 2 to 5 | 2.89 |
| Iron oxide | 0.25 to 1 | .64 |
| 150 mesh powdered amber mica | 0.25 to 1 | .64 |
| Powdered cresol resin | 15 to 20 | 18.62 |
| Hexamethylenetetramine | 0.25 to 1 | .70 |
| Carbon black | 0.25 to 1 | .90 |
| Graphite | 0.25 to 1 | .35 |
| Blood albumen | 1 to 4 | 2.76 |
| Shingle asbestos fiber | 30 to 40 | 36.60 |
| Fused and pulverized litharge | 1 to 5 | 2.76 |
| Scrap of final mixture | 1 to 10 | 8.10 |

In carrying out the process of making friction material from the substances mentioned and in accordance with the assemblage of these substances in groups A, B and C, the materials of each group are independently assembled and subsequently combined in a unified mass for treatment. In the case of the group A materials, the powdered mica, the iron oxide and the slip clay are mixed in a ball mill for about fifteen minutes or until a uniform mix of these constituents is obtained. A mill of this type is made by the Paul Abbe Company. Double X (XX) asbestos fibre, as previously described, is added to the mix from the ball mill and the assembled materials treated in a tumbling barrel for about one-half hour or until the non-fibrous filling material has been dispersed and distributed throughout the asbestos fibers. The contents of the tumbling barrel is then placed in a dough mixer such as that manufactured by Warner & Pfleiderer. To the dough mixer is added also the sulphurized linseed oil, liquid cresol resin and sulphur which previously has been stirred together cold in a pony mixer until the sulphur is finely distributed throughout the oil and resin. The dough mixer is operated for about one and one-quarter hours or until a uniform mix of small, ball-like particles ranging chiefly from $\frac{1}{16}''$ to $\frac{1}{8}''$ are formed.

This mix is then passed through a disintegrator such as that built by Christie & Norris Company, including a rotating drum with a corrugated lining and opposed vanes. By the action of this machine the lumps and clusters of fibres and other material which may have been formed in the dough mixer are broken up into small ball-like and usually semi-dry particles. The material is then placed in shallow pans and inserted in an oven where at a temperature of around 225° F., for example between 150° F. and 250° F., it is retained for a period of about three and one-half hours. This completes the preparation of the A composition and it is now in condition to be added to the B composition.

In preparing the B composition the non-fibrous material including the powdered cresol resin, the hexamethylenetetramine, carbon black, blood albumen, graphite and the fused and pulverized litharge are mixed together in the ball mill until uniformity of mix is obtained. The shingle asbestos fibre, as previously described, which has been properly cleaned, freed from rock dust, opened and fluffed, is then added to the non-fibrous material in a tumbling barrel which is tumbled and mixed for a period of approximately one-half hour or until the non-fibrous filling material has been thoroughly dispersed through the asbestos fibres. At this point, that is, after the mixing of the fibrous and non-fibrous stock in the tumbling barrel, the A composition mix is added together with scrap of the final product and the mixture of the A and B compositions are tumbled for about a half hour, after which they are removed from the barrel and passed through the disintegrator. The action of the disintegrator is to break up any large lumps or clusters of fibres which have been formed in the materials and obtain a more thorough mix of the two groups of substances. The product as obtained from the disintegrator and consisting of a mixture of groups A and B materials is the final mixture and includes all the materials that enter into the friction face of the completed lining.

There remains to describe the preparation of the C composition mixture. A ball mill is utilized as the first operation in the treatment of the C composition materials, the non-fibrous substances, carbon black and the powdered cresol resin being introduced into this mill and thoroughly mixed. The resultant mixture, together with the shingle asbestos fibre and scrap of final mixture, is then introduced into a tumbling barrel where these materials are tumbled until a uniform mix is obtained and the non-fibrous materials distributed throughout the fibrous stock. The mixture is then passed through a disintegrator to break up clusters of fibres and balls of the substance, thus obtaining the final mix.

In describing the molding steps of the process the description will be limited to the formation of a brake lining. In carrying out this step of the process a preliminary flat sheet of the material is first obtained. Any suitable means for making this sheet may be used, but I prefer to employ a rectangular mold as shown in Fig. 1, having a false or loose bottom 10 and an open top in which a rectangular plunger 11 may have movement to compress the material within the box. In carrying out the process a layer of the C composition is placed on the false bottom of the box where it is loosely and evenly distributed over the entire surface. The depth of the material of course will vary with the final thickness of the brake lining, the approximate thickness being one inch or 16 times the finished thickness of the C layer. Upon this C composition layer a predetermined amount of the mixed A and B compositions is evenly distributed to such a depth that the thickness of the A—B—C layer is approximately 15 times that of the molded segment. The plunger part of the mold is then put in place and the material pressed cold in a suitable press at from 100 to 200 pounds pressure per square inch to a thickness approximately five times greater than the required thickness of the finished segments.

This preliminary sheet or slab 12 of friction material does not have sufficient strength for handling but must be handled on suitable trays. In removing the compressed preliminary slab from the preliminary mold, the plunger and the side frame of the mold is lifted upward to free the top and bottom of the slab. A sheet of Cellophane 13 about 0.001 inch thick is laid over the top of the preliminary sheet or slab and extended over the edges of the same about ¾" or at least equal to twice the finished thickness of the slab. Upon this sheet of Cellophane is laid a flat sheet-metal plate 14 which has the approximate length and width of the slab. With the sheet of Cellophane and the metal plate in place on top of the slab and the slab lying upon the false bottom of the mold, the whole unit is reversed so that the slab is now lying upon the sheet of Cellophane and the sheet-metal plate. The bottom part of the mold may then be removed and another sheet of Cellophane 15 placed on the slab, this sheet having the approximate dimensions of the other sheet, the ends extending about ¾" beyond the slab. Upon this second sheet of Cellophane is laid another sheet-metal plate 16 which has the same length and width as the bottom sheet-metal plate. The preliminary sheet or slab is now a unit which is ready for the heat treatment.

In carrying out the heat treating step of the process the preliminary slab, including the supporting metal and Cellophane sheets, is placed in the bottom of a heated single cavity plunger type mold 17, Fig. 5, which is slightly larger than the slab and is here subjected to pressure of 500 to 1,000 pounds but preferably about 800 pounds per square inch at a temperature between 250° F. and 320° F. but preferably around 290° F. for from one to six minutes. During this operation under heat and pressure the fibres are compacted and the powdered cresol resin melts and flows around the fibres and non-fibrous material and starts to react and polymerize. The hexamethylenetetramine in the composition also melts and starts to combine with the cresol resin. This pressure of 800 pounds, however, is not sufficient to produce the maximum density desired and reduces the thickness of the material to a value at least 1.2 times greater than the thickness of the finished friction material. If maximum density were imparted at this step of the process it would be impossible to curve the sheet without cracking, even though the bond were still fluid or plastic. Another reason for not imparting maximum density to the heated slab is that blistering is apt to occur while removing the compressed sheet from the heated mold. It is highly important in this operation that the powdered cresol resin melts to a fluid before starting to polymerize and that the compressed composition slab is removed from the mold at the point where the cresol resin is melted to a fluid and just starts to polymerize. The compressed sheet 18, Fig. 6, and the supporting metal plates are removed from the mold while hot by admitting air under pressure to the ducts 19 on the bottom side of the bottom plate, this forcing the slab upwardly where it can be secured and removed. The sheet-metal plates 14 and 16 are at once removed from the slab and the composition sheet is bent over a suitable mandrel 20, Fig. 6, having a desired curvature. This curved composition sheet is then quickly placed in a curved sheet-metal pan 21 and the pan placed in a cold curved cavity mold where the sheet is allowed to cool while under a pressure of about 125 pounds per square inch. After this curved sheet is cold the preliminary treatment will have been completed and the sheet may be stored in this form or subjected to final treatment, as desired.

The function of the Cellophane sheets 13 and 15, inserted between the preliminary slab and the metal plates, is for preventing the preliminary slab from sticking to these plates and to make it possible to remove the plates from the hot compressed sheet rapidly. In addition, the Cellophane adheres to the slab itself and thereby assists in holding the material to a uniform arc in the bending operation and preventing cracking of the material.

The final treatment of the semi-curved slab 20 consists in the complete cure of the material which is accomplished by placing the curved composition sheet 20 in a curved sheet-metal pan and placing the pan in a curved cavity mold 22 where, under a pressure from 1,000 to 2,000 pounds but preferably around 1500 pounds per square inch at a temperature between 250° F. and 320° F. or approximately 300° F. for a time period between one-half and one and one-half hours, the maximum density is imparted to the sheet and the cresol resin passes over into the infusible state. In this pressure operation the Cellophane, which still adheres to the curved sheet, prevents sticking of the sheet to the metal pans. After removal from the curved mold the sheets are cooled and may be stored in stock for further processing in this slab form.

Proceeding with the operation, the curved sheet is cut into segments of the required widths by any suitable means and then ground on all sides to the required dimensions. The individual ground segments 23 are then placed on trays or any suitable conveyor in an oven 24, Fig. 8, where they are baked for approximately two hours, or from one to four hours, while heated at a temperature between 150° F. and 250° F. or around 225° F. In this final baking operation the trapped gases are removed, the resinous bond in the B and C compositions is completely transformed to its infusible state and the sulphurized linseed oil in the A composition takes on its final resilient set. After the baking is completed the segments are removed from the oven and cooled, this completing the manufacture of the brake lining.

Instead of cutting the curved cured sheets into segments they may be ground on all sides and baked as in the case of the individual segments and furnished to the jobbing trade where dealers may cut various sizes of segments from the sheet or slab as desired.

The final friction lining 25, Fig. 9, as made by the above process consists of areas 26 of rigid material derived from the B composition and intermediate areas of resilient material derived from the A composition, the B composition material serving as a framework for supporting the A composition material. The C composition 27 in the final product has a thickness of approximately $\frac{1}{16}$" but may vary from one-fifth to one-twelfth of the thickness of the finished lining, depending upon the lining thickness. For example, in a $\frac{3}{16}$" lining the C composition is approximately one-fifth of the thickness.

Of the various materials employed in the friction lining as above described, as previously mentioned, each has its particular function in cooperating to make the brake lining effective. In general the different materials have a hardness of 3 Mohs or less, so that the composite hardness of the lining is 3 Mohs or less, and consequently it is impossible to scratch the metal surface of the cooperating brake drum which is made of cast iron or soft steel. The various particles for the most part have a flat, plate-like formation highly resistant to normal pressure but at the same time breaking down under shear pressure with jagged edges tending to resist side movement and thus intensify the frictional effect. The use of materials such as mica and carbon black serve to prevent glazing and unstable friction properties; the use of slip clay provides density factors as well as assists in the mixing process; the linseed oil in conjunction with the sulphur provides the resilient yielding factor to the brake lining surface; the litharge supplies an effective frictional element for high temperatures; the asbestos binds the various substances together throughout the temperature range of use; and the resin forms the base of a rigid framework or holding means for the primary friction substances. With these materials assembled according to my process I am able to manufacture a brake lining which maintains practical uniformity of the coefficient of friction up to temperatures around 400° F. and at 900° F. has diminished from this uniform value by less than 35%.

While I have specified certain materials as entering into this composition, it is of course apparent that equivalent substances may be substituted. For example, for the cresol resin may be substituted cresol formaldehyde resin, phenol furfural resins, other furfural resins or certain types of synthetic resins which will become infusible with heat and not exceed a hardness of 3 Mohs. Instead of blown, bodied or boiled linseed oil certain other vegetable oils such a China-wood oil, either alone or in combination, may be used, or a limited amount of rubber, to supply the resilient factor. Intsead of carbon black other carbon sources such as coal tar coke might be employed. However, the particular elements forming the composition hereinabove described have been found to be superior in the relationships named.

I claim as my invention:

1. The process of making a friction unit comprising placing raw backing materials in a mold, covering the backing with a layer of friction material, compressing the combined layers of friction and backing material cold to a slab having a thickness approximately five times greater than that of the finish unit, placing sheets of Cellophane on both sides of said slab, compressing the slab at a pressure above 500 pounds per square inch in a heated mold at a temperature between 250° F. and 320° F. to bring about partial curing and a further reduced thickness, removing the slab from the heated mold after one minute or before the contained resin of the material begins to polymerize, curving the slab over a form, applying pressure to the curved slab without heat, applying pressure of over 1,000 pounds per square inch at a temperature above 250° F. for about one-half hour to effect the final cure of the resinous element, forming the finally cured slab into units of the desired dimensions, and subjecting the units to a baking operation at a temperature in excess of 150° F. for over one hour.

2. The process of making a friction unit comprising placing the raw friction materials in a mold, compressing the materials cold to compact the same into a slab, applying Cellophane sheets to both sides of said slab, compressing the slab flat at a pressure in excess of 500 pounds at a temperature of over 250° F. for approximately four minutes, curving the slab while hot on a form to the desired shape, permitting the curved slab to cool under a pressure in excess of 100 pounds per square inch, applying pressure of over 1,000 pounds per square inch to the curved slab at a temperature over 250° F. for about one hour, forming the slab to the size of the finished unit, and baking the unit for approximately two hours at a temperature in excess of 150° F.

3. A step in the process of making a friction unit containing a resinous compound which comprises subjecting a flat slab of the raw material to a pressure of over 500 pounds per square inch at a temperature of over 250° F. for a time period sufficient to liquify the resin but insufficient to polymerize the same, curving the slab while hot to the required form, cooling, and subsequently applying a pressure in excess of 1,000 pounds per square inch at a temperature over 250° F. for a time period sufficient to bring about approximately complete polymerization of the resinous compound.

4. A step in the process of forming a friction unit which comprises compresing a flat slab of the raw material containing cresol resin, vegetable oil and sulphur at an elevated temperature and pressure for a time period sufficient to liquify the resin but insufficient to polymerize the same, curving the flat slab to the desired shape, permitting the formed slab to cool under pressure, applying a pressure in excess of 1,000 pounds and heat in excess of 150° F. to the curved slab for a time period sufficient to complete approximately the polymerization of the resin and the combination of the sulphur and the oil, and finally baking the friction material at a temperature in excess of 150° F. for a time period sufficient to complete polymerization of the resin and sulphurization of the oil.

5. A step in the process of making a friction unit from raw materials including a bond which comprises compressing the raw material to the form of a flat slab, applying sheets of Cellophane to both sides of the slab, subjecting the slab to pressure in excess of 500 pounds and a temperature over 150° F., for a time period sufficient to liquify the bonding material but insufficient to solidify the same after liquification, forming the heated slab into the desired shape, and permitting the shaped slab into the desired shape, and permitting the shaped slab to cool under pressure in excess of 75 pounds per square inch.

6. The process of making a friction unit comprising placing raw backing materials in a mold, covering the backing with a layer of friction material, compressing the combined layers of friction and backing material cold to a slab having a thickness approximately five times greater than that of the finished unit, placing sheets of Cellophane on both sides of said slab, said sheets projecting beyond the edges of the slab, compressing the slab at a pressure between 500 and 1,000 pounds per square inch in a heated mold at a temperature of between 250° F. and 320° F. to bring about partial curing and a further reduced thickness, removing the slab from the heated mold after one to six minutes or before the contained resin of the material begins to polymerize, curving the slab over a form, applying pressure to the curved slab without heat, applying pressure of between 1,000 and 2,000 pounds per square inch at a temperature between 250° F. and 320° F. for from one-half to one and one-half hours to effect the final cure of the resinous element, forming the finally cured slab into units of the desired dimensions and subjecting the units to a baking operation at temperatures between 150° F. and 250° F. for from one to four hours.

7. The process of making a friction unit comprising placing raw backing materials in a mold, covering the backing with a layer of friction material, compressing the combined layers of friction and backing materials cold to a slab having a thickness approximately five times greater than that of the finished unit, placing sheets of Cellophane on both sides of said slab, compressing the slab at a pressure around 800 pounds per square inch in a heated mold at a temperature of approximately 290° F. to bring about partial curing and a further reduced thickness, removing the slab from the heated mold after about four minutes or before the contained resin of the material begins to polymerize, curving the slab over a form, applying pressure to the curved slab without heat, applying pressure approximating 1500 pounds per square inch at a temperature around 300° F. for about one hour to effect the final cure of the resinous element, forming the finally cured slab into units of the desired dimensions and subjecting the units to a baking operation at around 225° F. for approximately two hours.

8. The process of making a friction unit comprising placing the raw friction materials in a mold, compressing the materials cold to compact the same into a slab, applying Cellophane sheets to both sides of said slab, compressing the slab flat at a pressure of about 800 pounds at a temperature of approximately 280° F. for about four minutes, curving the slab while hot on a frame to the desired shape, permitting the curved slab to cool under a pressure of approximately 125 pounds per square inch, applying pressure of approximately 1500 pounds per square inch to the curved slab at around 300° F. for about one hour, forming the slab to the size of the finished unit, and baking the unit for approximately two hours at a temperature of around 225° F.

WILLIAM NANFELDT.